Patented Dec. 28, 1943

2,337,940

UNITED STATES PATENT OFFICE 2,337,940

METHOD OF TREATING ALUMINUM SURFACES

Roy Shawcross, Salina, Pa., assignor to Aluminum Company of America, Pittsburgh, Pa., a corporation of Pennsylvania No Drawing. Application March 25, 1943, Serial No. 480,519

5 Claims. (Cl. 148—6)

This invention relates to a method of treating aluminum surfaces and is particularly concerned with the production thereon by non-electrolytic means of a hard, adherent and adsorptive coating consisting in large part of aluminum oxide. The term "aluminum" as employed herein and in the appended claims is intended to embrace aluminum as well as aluminum base alloys.

A variety of methods have been proposed for producing oxide coatings on aluminum by non-electrolytic, chemical treatment, though many possess various drawbacks. For example, some of these processes suffer the disadvantage that the coating produced thereby on various aluminum alloys, notably those containing substantial amounts of copper, is not sufficiently hard for many applications. Furthermore, the coatings produced on these copper-containing alloys in many cases have a tendency to smudge to a greater or less extent.

It is accordingly an object of this invention to provide an improved method for producing an oxide coating on aluminum surfaces by non-electrolytic, chemical treatment. A further object is to provide a solution useful in forming a serviceable oxide coating on aluminum alloys including those containing copper.

I have discovered that a solution containing alkali metal carbonate together with an alkali metal-chrome salt of a glucoside, the balance of the solution being substantially water, will provide an adherent, hard, and adsorptive coating on the surfaces of both cast and wrought aluminum articles, including those composed of aluminum alloys containing substantial amounts of copper. The aluminum-copper alloys to which I refer usually contain from about 1 to 10 per cent by weight of copper among other constituents.

The amount of alkali metal carbonate to be employed in the bath may vary between wide limits. For example, as little as 0.25 per cent by weight of this component has been found to produce an operable solution, whereas other solutions containing as much as 20 per cent thereof have also given good results. From a commercial standpoint, however, I prefer to employ about 1 to 5 per cent by weight of alkali metal carbonate, by which term I mean to include the carbonates of the alkali metals as well as ammonium carbonate. Of these alkali metal carbonates I have found it preferable to employ sodium carbonate.

The glucosides are compounds largely derived from the plant kingdom. Their salts, known as glucosates, which are useful for the purpose of this invention are those formed by reacting a glucoside with both alkali metal and chromate ions, and which are soluble in water, that is, which either dissolve in or form a colloidal solution with water. For example, a suitable chrome glucosate salt may be formed by reacting sodium chromate ($Na_2CrO_4 10H_2O$) with either saponin or with α-methyl glucoside, or with other well-known glucosides. Readily prepared glucosates, such as that marketed by D. W. Haering Company, Chicago, Illinois, under the name "Sodium Chrom Glucosate," may also be employed. Many of the glucoside salts which are useful for the purposes of this invention are thought to have the general formula

$$CHOR.CHOR'.CHOH.CH.CHOCr_2O_4R'CH_2OH$$

wherein R represents a long chain organic radical and R' represents an alkali metal. Other structural arrangements are of course possible.

The weight of the glucosate portion of the solution may range from about 0.05 to 0.5 times that of the alkali metal carbonate, though I prefer that the weight of the glucosate be about 0.1 to 0.5 that of the carbonate. Inasmuch as the chromium content of the solution is depleted with each sample of metal coated, it becomes necessary to replenish this constituent of the solution from time to time. This may be accomplished by periodic additions of a stock solution of the glucosate.

In the practice of this invention I have found it convenient to prepare the glucosate by first melting a quantity of sodium chromate $$(Na_2CrO_4.10H_2O)$$

in its own water of crystallization and thereafter stirring the glucoside into that solution. I have found it necessary in many cases to warm and stir the resulting glucosate solution for a period of several hours before introducing it into a water solution of the carbonate.

This coating solution may be employed at any temperature between about 20 and 100° C., though I prefer a working range between about 70 and 100° C. The necessary immersion period to obtain a given coating thickness and weight will vary depending on the temperature and concentration of the bath. In general, good protective coatings may be produced by an immersion period of 20 minutes when the bath is maintained at or above 80° C., though with extremely dilute solutions a somewhat longer immersion period may be necessary. Again, at low temperatures, it may be necessary to keep the article in the bath for a period of several hours in order to produce a serviceable coating.

In the preferred practice of my invention, the newly prepared bath is first worked at operating temperatures for a period of about 20 to 30 minutes with scrap aluminum. This has the effect of stabilizing the bath. If this step is omitted, the coatings initially produced by the solution are likely to be somewhat heavier than those which follow.

As a specific example of the method of coating aluminum according to the process of this invention, the following example is given. A solution was prepared containing 2 per cent by weight sodium carbonate and 0.5 per cent by weight sodium-chrome glucosate, and the balance water. The glucosate added had been prepared by interacting 139 grams sodium chromate ($Na_2CrO_4.10H_2O$) with 50 grams saponin. The bath was then heated to a temperature of about 90° C. and was worked for about 30 minutes with scrap aluminum, which has the effect of stabilizing the solution. Several pieces of aluminum sheet made up of an alloy containing about 4.5 per cent copper were then successively immersed in the bath and the treatment continued in each case for a period of about 20 minutes. After treatment, the surface of each sample was found to be coated with a hard, adsorbent, adherent coating, which resisted any tendency to smudge. The corrosion resistance of the coating was improved by sealing in an aqueous dichromate solution in the fashion described in U. S. Patent No. 1,946,152.

I claim:

1. In a method of producing a hard, adherent and adsorptive oxide coating on aluminum articles, the step comprising treating said articles in an aqueous bath containing in solution about 0.25 to 20 per cent by weight alkali metal carbonate, together with an alkali metal-chrome glucosate, the weight of said glucosate being about 0.05 to 0.5 that of said alkali metal carbonate.

2. A method of producing a hard, adherent and adsorptive oxide coating on aluminum articles, comprising treating said articles in an aqueous bath containing in solution about 1 to 5 per cent by weight alkali metal carbonate, together with an alkali metal-chrome glucosate, the weight of said glucosate being about 0.05 to 0.5 that of said alkali metal carbonate.

3. A method of producing a hard, adherent and adsorptive oxide coating on aluminum articles, comprising treating said articles in an aqueous bath containing in solution about 1 to 5 per cent by weight alkali metal carbonate, together with an alkali metal-chrome glucosate, the weight of said glucosate being about 0.1 to 0.5 that of said alkali metal carbonate.

4. A method of producing a hard, adherent and adsorptive oxide coating on aluminum articles, comprising treating said articles in an aqueous bath containing in solution about 1 to 5 per cent by weight sodium carbonate, together with sodium-chrome glucosate, the weight of said glucosate being about 0.05 to 0.5 that of said sodium carbonate.

5. A method of producing a hard, adherent and adsorptive oxide coating on aluminum articles, comprising treating said articles in an aqueous bath containing in solution about 1 to 5 per cent by weight alkali metal carbonate, together with an alkali metal-chrome glucosate, the weight of said glucosate being about 0.1 to 0.5 that of said alkali metal carbonate, said bath being maintained at a temperature of about 70 to 100° C.

ROY SHAWCROSS.

CERTIFICATE OF CORRECTION.

Patent No. 2,337,940.  December 28, 1943.

ROY SHAWCROSS.

It is hereby certified that error appears in the printed specification of the above numbered patent requiring correction as follows: Page 1, second column, line 6, for "($Na_2CrO_4 1OH_2O$)" read --($Na_2CrO_4 \cdot 1OH_2O$)--; and that the said Letters Patent should be read with this correction therein that the same may conform to the record of the case in the Patent Office.

Signed and sealed this 8th day of February, A. D. 1944.

(Seal)

Henry Van Arsdale,
Acting Commissioner of Patents.